United States Patent
Gao et al.

(10) Patent No.: US 12,246,281 B2
(45) Date of Patent: Mar. 11, 2025

(54) BEARING DEVICE IN RADIAL FLOW ADSORBER WITH GAS FLOW GUIDE FUNCTION

(71) Applicant: HANGZHOU OXYGEN PLANT GROUP CO., LTD., Hangzhou (CN)

(72) Inventors: Yi Gao, Hangzhou (CN); Yisong Han, Hangzhou (CN); Xiuna Lin, Hangzhou (CN); Yun Wu, Hangzhou (CN); Xudong Peng, Hangzhou (CN); Jiang Chen, Hangzhou (CN); Bo Chang, Hangzhou (CN)

(73) Assignee: HANGZHOU OXYGEN PLANT GROUP CO., LTD., Hangzhou (CN)

( * ) Notice: Subject to any disclaimer, the term of this patent is extended or adjusted under 35 U.S.C. 154(b) by 472 days.

(21) Appl. No.: 17/816,430

(22) Filed: Aug. 1, 2022

(65) Prior Publication Data

US 2023/0032954 A1  Feb. 2, 2023

(30) Foreign Application Priority Data

Aug. 2, 2021  (CN) ......................... 202110879738.X

(51) Int. Cl.
 *B01D 53/04* (2006.01)
 *F01C 21/02* (2006.01)
 *F25J 3/04* (2006.01)

(52) U.S. Cl.
 CPC ..... *B01D 53/0431* (2013.01); *B01D 53/0446* (2013.01); *F01C 21/02* (2013.01); *F25J 3/04248* (2013.01)

(58) Field of Classification Search
 CPC ............ B01D 53/0431; B01D 53/0446; B01D 53/0462; B01D 53/04; B01D 53/02; B01D 53/26; B01D 53/14; B01D 53/06; B01D 2253/202; B01D 15/10; B01D 15/08; B01D 46/0036; B01D 46/0056; B01D 46/26; B01D 2325/22; B01D 24/32;
 (Continued)

(56) References Cited

U.S. PATENT DOCUMENTS

| | | | |
|---|---|---|---|
| 6,334,889 B1 * | 1/2002 | Smolarek | B01D 53/0446 96/152 |
| 6,364,957 B1 * | 4/2002 | Schneider | C23C 16/4585 118/500 |
| 2011/0271833 A1 * | 11/2011 | Tentarelli | B01J 20/103 96/108 |

FOREIGN PATENT DOCUMENTS

CN  108854857 A  * 11/2018  .............. B01J 8/003

* cited by examiner

*Primary Examiner* — Brandy S Lee
*Assistant Examiner* — Rachel Marie Slaugenhaupt
(74) *Attorney, Agent, or Firm* — Proi Intellectual Property US

(57) ABSTRACT

A bearing device in a radial flow adsorber with a gas flow guide function includes a bearing platform, a supporting cylinder, a flow guide pipe, an annular bottom plate, a limiting block and a supporting frame, wherein an upper portion of the bearing platform is filled with adsorbent, an interior of a lower portion of the bearing platform is connected with the annular bottom plate through the supporting cylinder, a backing plate is arranged between the bearing platform and the supporting cylinder, on the supporting cylinder or the annular bottom plate is opened a hole and arranged a plurality of flow guide pipes for guiding gas flow, the annular bottom plate is placed on the supporting frame, the limiting block is arranged on the supporting frame, and the supporting frame is fixed on a cylinder body or a lower head of the adsorber by welding.

4 Claims, 1 Drawing Sheet

(58) Field of Classification Search
CPC . C10J 2200/09; F25J 3/04248; F25J 3/04169; F25J 3/04854; F01D 25/162; F01D 25/166; F01C 21/02; F01B 3/005; F28F 2265/26; F28F 2265/18; F28F 2265/14; F28F 2280/08; F16C 13/00; F16C 13/02; F16C 17/10; F16C 17/02; F16C 2300/34; F16C 32/0651; F16C 32/0402; F16C 32/0425; F16C 32/00; F16C 33/1085; F16C 33/1055; F16C 27/02; F16C 27/063; F16C 11/0661; F04D 29/04; F04D 29/046

See application file for complete search history.

BEARING DEVICE IN RADIAL FLOW ADSORBER WITH GAS FLOW GUIDE FUNCTION

TECHNICAL FIELD

This device is applicable to a radial flow adsorber for an air separation plant, pertaining to the technical field of gas separation.

BACKGROUND

The role of a purification system in a cryogenic air separation unit is to remove high boiling point gas impurities such as water and carbon dioxide. The working process of the system includes both pressure alternation and temperature alternation. The core equipment of the system, a radial flow adsorber, is a typical fatigue vessel. Due to the needs of the process, the radial flow adsorber works in two states of adsorption and desorption. The inside of the equipment is at normal temperature during adsorption, and the temperature inside the equipment is greater than 150° C. during desorption. Therefore, the internal parts of the equipment need to withstand large temperature change. Usually, the adsorber and its internal parts are made of carbon steel or stainless steel. Due to thermal expansion and cold contraction of metal, the internal parts of the adsorber will all expand and contract as the working temperature changes. The function of the bearing device inside the radial flow adsorber is to support the weight of the adsorbent and internal parts. During the operation of the equipment, the thermal expansion and cold contraction caused by temperature change will cause friction between the steel plates of the bearing device, overall translation, even jamming and other situations, leading to very large local stress, thereby resulting in damage and failure of the device. Therefore, there is a need for a bearing device with a reasonable structure that can overcome these problems that cause large local stress and improve the reliability and safety of the equipment.

SUMMARY

The present disclosure provides a bearing device used inside a radial flow adsorber for an air separation unit, which can support the weight of the internal adsorbent and the internal parts of the adsorber. When the adsorber works under high and low temperature alternation, the device can be maintained at normal temperature without change in shape and size, thereby avoiding increase of local stress due to thermal expansion of structure and improving the reliability and service life of the device. The objective of the present disclosure is achieved through the following technical scheme. A bearing device in a radial flow adsorber with a gas flow guide function includes a bearing platform, a supporting cylinder, a flow guide pipe, an annular bottom plate, a limiting block and a supporting frame, wherein an upper portion of the bearing platform is filled with adsorbent, an interior of a lower portion of the bearing platform is connected with the annular bottom plate through the supporting cylinder, a backing plate is arranged between the bearing platform and the supporting cylinder, on the supporting cylinder or the annular bottom plate is opened a hole and arranged a plurality of flow guide pipes for guiding gas flow, the annular bottom plate is placed on the supporting frame, the limiting block is arranged on the supporting frame, and the supporting frame is fixed on a cylinder body or a lower head of the adsorber by welding.

Preferably, the bearing platform employs an upward convex spherical-cap shaped head or a circular flat plate or a downward convex spherical-cap shaped head.

Preferably, the plurality of flow guide pipes is arranged on the supporting cylinder or the annular bottom plate evenly and obliquely, and the flow guide pipe is shaped as a circular pipe, a square pipe, an oval pipe or any pipe whose opening is a circular hole, a square hole or an oval hole.

Preferably, there are at least three supporting frames, which are evenly fixed on a cylinder body of the adsorber or a lower head along the circumferential direction, each of the supporting frames is welded with the limiting block, and the limiting block is structured as an L-shaped angle steel which can limit the rotation or movement of the annular bottom plate.

The present disclosure is used inside a radial flow adsorber as a bearing device, mainly to bear the weight of the internal adsorbent and the internal parts. When the adsorber works under high and low temperature alternation, the device can be maintained in a normal temperature state, generating no deformation and causing no friction between the structures, so that the stress distribution state of the structures is improved, and the reliability and safety of the device are improved.

DETAILED DESCRIPTION

Figure 1:
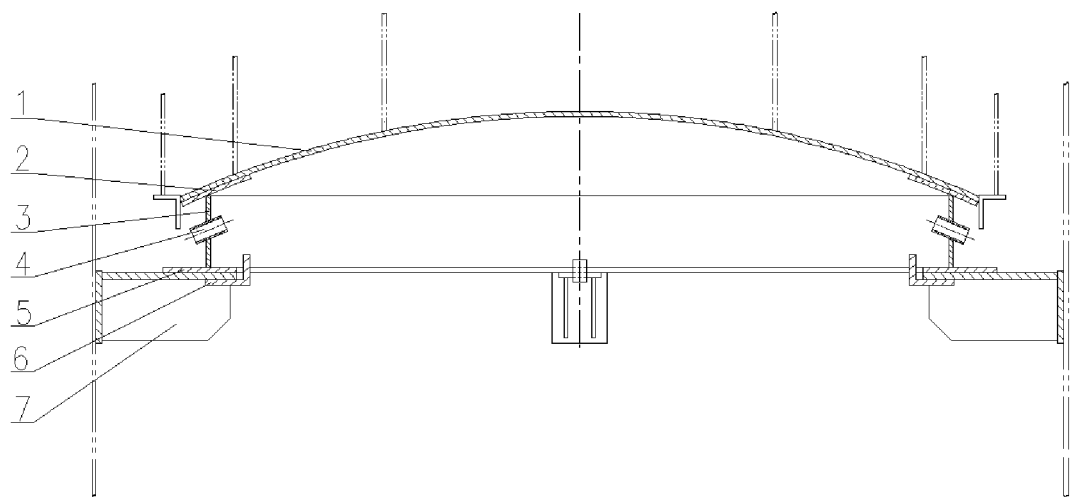
FIG. 1 is a structure diagram of the present disclosure.
Figure 2:
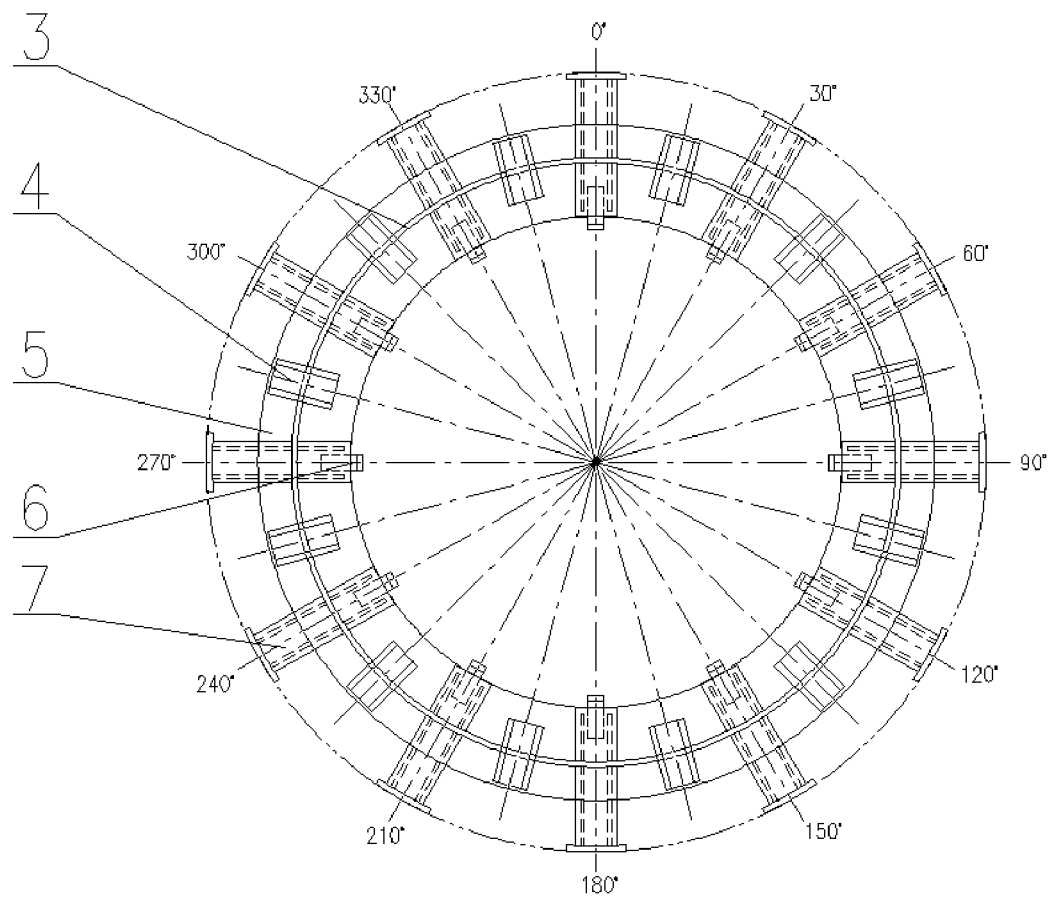
FIG. 2 is a top view of the present disclosure.

The present disclosure is described below in detail in conjunction with accompanying drawings. With reference to FIG. 1 to FIG. 2, the present disclosure provides a bearing device in a radial flow adsorber with a gas flow guide function, which includes a bearing platform 1, a supporting cylinder 3, a flow guide pipe 4, an annular bottom plate 5, a limiting block 6 and a supporting frame 7, wherein an upper portion of the bearing platform 1 is filled with adsorbent, an interior of a lower portion of the bearing platform is connected with the annular bottom plate 5 through the supporting cylinder 3, a backing plate 2 is arranged between the bearing platform 1 and the supporting cylinder 3, on the supporting cylinder 3 or the annular bottom plate 5 is opened a hole and arranged a plurality of flow guide pipes 4 for guiding gas flow, the annular bottom plate 5 is placed on the supporting frame 7, wherein the supporting frame 7 is composed of rib backing plates, has certain strength and is welded on a cylinder body of the adsorber, the limiting block 6 is arranged on the supporting frame 7, the supporting frame 7 is fixed on the cylinder body or a lower head of the adsorber by welding, the bearing platform 1 employs an upward convex spherical-cap shaped head or a circular flat plate or a downward convex spherical-cap shaped head, the plurality of flow guide pipes 4 is arranged on the supporting cylinder 3 or the annular bottom plate 5 evenly and obliquely, and the flow guide pipe 4 is shaped as a circular pipe, a square pipe, an oval pipe or any pipe whose opening is a circular hole, a square hole or an oval hole, there are at least three supporting frames 7, which are evenly fixed on the cylinder body of the adsorber or the lower head along the circumferential direction, each of the supporting frames 7 is welded with the limiting block 6, and the limiting block 6 is structured as an L-shaped angle steel which can limit the rotation or movement of the annular bottom plate 5.

The present disclosure is used inside a radial flow adsorber as a bearing device, mainly to bear the weight of the internal adsorbent and the internal parts. When the adsorber works under high and low temperature alternation, the device can be maintained in a normal temperature state, generating no deformation and causing no friction between the structures, so that the stress distribution state of the structures is improved, and the reliability and safety of the device are improved.

The specific working principle is as follows. The desorption process of a radial flow adsorber involves two stages of heating and cold blowing. During the heating process, a high-temperature gas enters from an inlet pipe on a top of the adsorber and flows towards the central position on an upper surface of the bearing platform 1, and, when the high-temperature gas passes through an adsorbent bed, the heat is carried away by desorption and the high-temperature gas changes into a normal-temperature gas which is then guided to the center of the bearing platform 1 through the flow guide pipe. Thus, the heat exchange by forced convection carries away the heat of the bearing platform 1, making the bearing device maintained in a normal temperature state all the time. During the cold blowing process, a normal-temperature gas enters from an inlet pipe on a top of the adsorber and flows towards the center of the bearing platform 1, and then, the normal-temperature gas, when passing through an adsorbent bed, performs heat exchange with the adsorbent and changes into a high-temperature gas to discharge. At this time, since the discharged high-temperature gas cannot reach the temperature of the high-temperature gas in the heating stage, the device can still be maintained in a normal temperature state. After the adsorber is manufactured and transported to the site, due to the internal stress of the internal parts of the adsorber, the internal parts have a requirement of deformation coordination when temperature changes after the device is installed and during the operation process; because the annular bottom plate 5 is placed on, rather than fixed by welding to, the supporting frame 7, and the role of the limiting block 6 is to prevent the annular bottom plate 5 rotating or moving during the deformation coordination, the reliability of the structure is ensured.

What is claimed is:

1. A bearing device in a radial flow adsorber with a gas flow guide function, comprising a bearing platform, a supporting cylinder, a flow guide pipe, an annular bottom plate, a limiting block and a supporting frame, wherein an upper portion of the bearing platform is filled with adsorbent, an interior of a lower portion of the bearing platform is connected with the annular bottom plate through the supporting cylinder, a backing plate is arranged between the bearing platform and the supporting cylinder, on the supporting cylinder or the annular bottom plate is opened a hole and arranged a plurality of flow guide pipes for guiding gas flow, the annular bottom plate is placed on the supporting frame, the limiting block is arranged on the supporting frame, and the supporting frame is fixed on a cylinder body or a lower head of the adsorber by welding.

2. The bearing device in the radial flow adsorber with the gas flow guide function according to claim 1, wherein the bearing platform employs an upward convex spherical-cap shaped head or a circular flat plate or a downward convex spherical-cap shaped head.

3. The bearing device in the radial flow adsorber with the gas flow guide function according to claim 1, wherein the plurality of flow guide pipes is arranged on the supporting cylinder or the annular bottom plate evenly and obliquely, and the flow guide pipe is shaped as a circular pipe, a square pipe, an oval pipe or any pipe whose opening is a circular hole, a square hole or an oval hole.

4. The bearing device in a radial flow adsorber with a gas flow guide function according to claim 1, wherein there are at least three supporting frames, which are evenly fixed on a cylinder body of the adsorber or a lower head along the circumferential direction, each of the supporting frames is welded with the limiting block, and the limiting block is structured as an L-shaped angle steel which can limit the rotation or movement of the annular bottom plate.

\* \* \* \* \*